United States Patent

[11] 3,632,450

| [72] | Inventors | James P. Coffey<br>Hatboro;<br>William E. Veit, Ivyland, both of Pa. |
|---|---|---|
| [21] | Appl. No. | 47,986 |
| [22] | Filed | June 22, 1970 |
| [45] | Patented | Jan. 4, 1972 |
| [73] | Assignee | ESB Incorporated |

[54] SIDE ENTERING STORAGE BATTERY TERMINAL CONSTRUCTION
4 Claims, 4 Drawing Figs.

[52] U.S. Cl. .................................................. 136/135 S, 136/168, 136/170
[51] Int. Cl. ....................................................... H01m 5/00
[50] Field of Search............................................ 136/135, 134, 166, 170, 81, 168

[56] References Cited

UNITED STATES PATENTS

| 2,620,370 | 12/1952 | Chapman ..................... | 136/134 R |
| 3,285,785 | 11/1966 | Shannon........................ | 136/168 |
| 3,303,056 | 2/1967 | Sabatino et al. .............. | 136/135 S |
| 3,309,235 | 3/1967 | Teeple, Sr. .................... | 136/171 |
| 3,457,118 | 7/1969 | Miller............................ | 136/135 S |

*Primary Examiner*—Anthony Skapars
*Attorneys*—Alfred J. Snyder, Jr., Robert H. Robinson, Raymond L. Balfour and Anthony J. Rossi

ABSTRACT: A side entering battery terminal construction is described wherein a portion of the battery terminal post is locked in a pocket formed in the battery container. A terminal insert penetrates the container wall and is friction welded to the end of the post.

PATENTED JAN 4 1972

3,632,450

INVENTORS.
JAMES P. COFFEY
WILLIAM E. VEIT

SIDE ENTERING STORAGE BATTERY TERMINAL CONSTRUCTION

BACKGROUND OF THE INVENTION

1. Field of the Invention

This invention relates to lead acid storage batteries. In particular, it describes a novel battery terminal connection.

2. Description of the Prior Art

In order to provide a storage battery capable of the maximum power output, it is desirable to have all electrical conductors as short and as direct as possible. In order to achieve this, it is desirable to bring the battery terminals out of the side or ends of the battery case rather than out of the top of the battery. By so doing, several inches of conductor can be eliminated. This feature has been used in certain aircraft and other extreme duty batteries but has not been used to any great extent in the automobile cranking battery. Among the designs that have been proven are found bolted connections using brass and copper parts, lead inserts molded into the battery walls, and rivets connecting the internal battery strap to an external electrical terminal. Although each of these arrangements can be satisfactory, each has certain peculiarities which prevent widespread use. The principal objection is that the best constructions either add to the cost of the materials used in the battery or increase the labor of manufacture. In a copending application, a method for forming electrical connections through the battery wall and into a battery post located within the battery. Frictional energy produced by rotating the terminal insert member causes the post and the insert to weld forming a unique terminal connection. Because of the forces used in making this terminal connection, it is desirable to provide support to the battery post.

SUMMARY OF THE INVENTION

In this invention, a battery designed for side or end wall location of terminals has strap extensions including a noncylindrical portion. A cavity molded partially in the battery container and partially in the battery cover contains a portion of the strap extension holding it against rotational and other motion with respect to the container. The extension is locked in the cavity by the sealing of the cover to the battery container. A battery terminal connection comprising a terminal post insert is attached by a friction welding procedure to the end of the strap extension so fastened in the container.

DESCRIPTION OF THE PREFERRED EMBODIMENT

Figure 1:
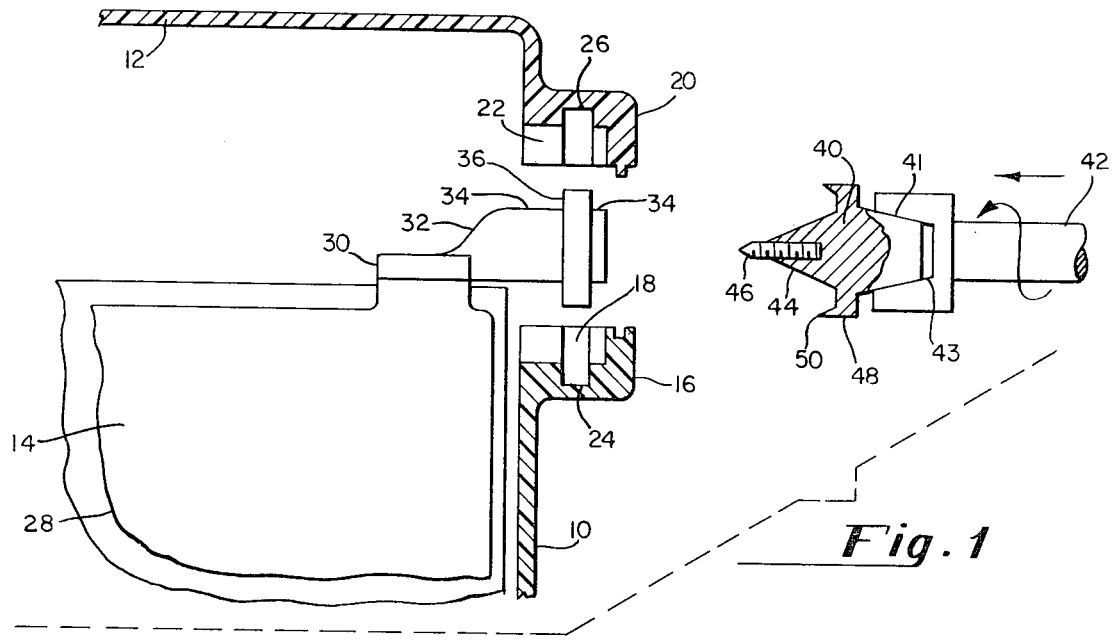
FIG. 1 illustrates an expanded cross section of part of a lead acid battery cell prior to the application of the terminal insert.

In FIG. 1, a portion of a storage battery case 10 is shown in section with a mating portion of the battery cover 12 above it. Case 10 and cover 12 together form the battery container. A portion of a battery element 14 is shown located between cover 12 and case 10. The lip of the case is enlarged as shown at 16. A cavity 18 is formed in the enlarged lip 16 of case 10. A similar enlargement 20 and cavity 22 is formed on the lip of cover 12. Portions 24 and 26 of cavities 18 and 22 are rectangular so that together they form a square. The battery element 14 is comprised of plates 28 attached together by strap 30. An extension 32 to the strap 30 is comprised of a cylindrical portion 34 and a square portion 36. 34 and 36 are sized to fit snugly in the combined cavities 18–22 and 24–26. Because square portion 36 of strap extension 32 is larger than the cylindrical body 34 of the extension 32 the strap extension when located in the cavity formed by 16 and 20 is firmly locked against both rotational and translational movement. In practice, cover 12 is permanently fastened to case 10 by cement, heat seal or other means at the time of assembly of the battery.

Figure 2:
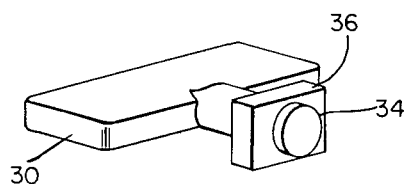
FIG. 2 portrays a perspective view of the battery strap used in the assembly of FIG. 1.

FIG. 2 illustrates in perspective the general shape of the strap 30 depicted in FIG. 1 with the various parts numbered as in FIG. 1.

A terminal insert 40 in FIG. 1 mounted in a rotatable translatable mandrel 42 is shown ready for attachment to the battery.

The outer end 41 of the insert 40 is shaped to form one of the terminals of the battery. For automotive use, this portion can take the form of a truncated cone as shown at 41 in FIG. 1. The insert 40 is held by a tapered socket 43 formed in the tool 42 matching the taper of the contact surface 41 of insert 40. The axis of socket 43 is on the axis of rotation of tool 42. The insert 40 is made from any suitable lead alloy compatible with service in storage battery use. The end 44 of the insert 40 opposite to the contact end 41 is also conical in shape. It tapers down to a drill point 46 of hard metal embedded in and forming a part of the insert. The insert is further characterized by a disc-shaped portion 48 located at the junction of the two conical portions 41 and 44. The disc 48 has a sharp lip 50 facing in the same direction as the drill point 46.

To join the terminal insert 40 with the strap extension 32, tool 42 with insert 40 mounted therein is rotated and forced against the side of the battery container on the axis of the strap extension 32. The drill point 46 thereby cuts a hole first through the plastic wall and then into the strap extension. As the tapered portion 44 of insert 40 engages first the plastic wall and subsequently the metallic extension 32, frictional heat is developed. This raises the plastic material to a temperature above its softening point allowing insert 40 to penetrate further. By the same mechanism, the lead of both the strap extension 32 and the tapered portion 44 of the insert 40 to heat up and become soft. This allows the insert 40 to penetrate into the extension 32. Sufficient heat is finally produced to bring local areas of both parts to their melting point. The rotating and forcing of part 40 is continued until the lip 50 of the insert is embedded in the battery container wall at which time the tool 42 is stopped and disengaged. The softened plastic material then cools down and contracts on the metal parts and the melted metal of extension 32 and insert 40 solidifies to form a welded metallic joint.

Figure 3:
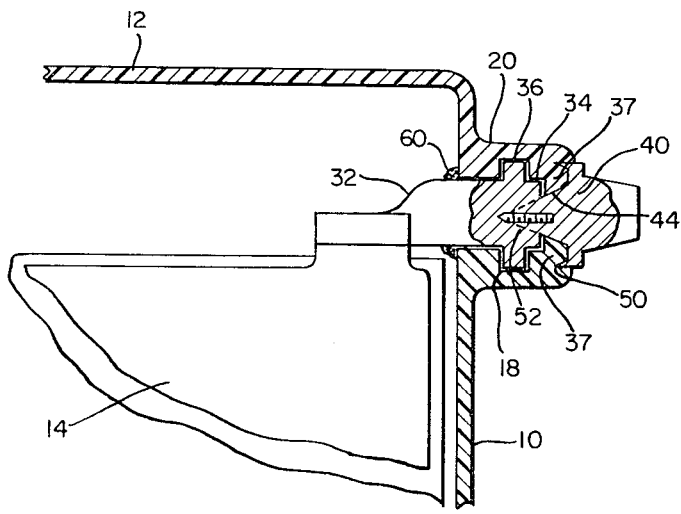
FIG. 3 illustrates the same section of a battery as portrayed in FIG. 1 after the terminal insert has been applied.

In FIG. 3, the parts shown in FIG. 1 have been assembled and the terminal insert has been attached by the operations described above. Cover 12 is shown attached to case 10 with the battery element 14 located within. The terminal insert 40 is shown traversing the web of container and cover material 37 and penetrating into extension 32. Dotted line 52 indicates the location of the metallic weld formed between the conical end 44 of insert 40 and strap extension 32. The sharp lip 50 of the insert is shown penetrating into the wall of case 10 and cover 12.

Figure 4:
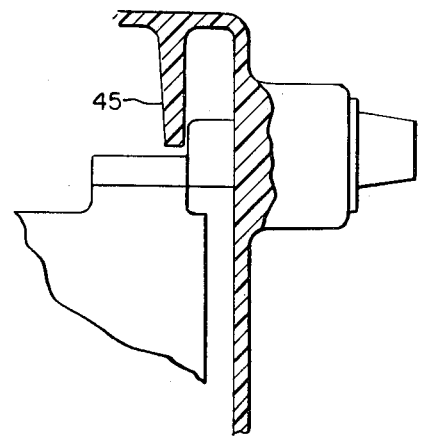
FIG. 4 illustrates a modified cover design for use with this invention.

The forces required to make a satisfactory and permanent connection between insert part 40 and strap extension 32 are quite high. A pressure of about 3/4 of a ton forcing the insert into the extension has been required in some tests. The square portion 36 of the strap extension 32 must be strong enough to resist these forces. However, it has been found that due to the heating of the insert when the friction weld between insert 40 and extension 32 is being made, the heat therefrom is sufficient to soften the square portion 36. To further hold extension 32 in place, it may therefore be desireable to form a dependent brace on the underside of the cell cover as shown at 45 in FIG. 4.

Although the fitting of the terminal insert to the battery as described above inherently makes a tight fit, it may be desirable to augment the seal by including a sealing material in the interface between the strap extension 32 (including portions 34 and 36) and the cavity formed by the case and cover. A suitable sealing material has been found to be a hot melt sealing material. In particular, hot melt compounds having an acid resin portion and a portion compatible with the material of the case and the cover is desirable. In FIG. 3, a bead of hot melt compound forced from the cavity 18–22 by the insertion of strap extension 32 is indicated at 60.

A battery assembly similar to that shown in FIG. 1 was prepared and the cover sealed in place. An insert was mounted in a tool held in the chuck of a small drill press. The tool and insert were rotated at a speed of about 5,000 revolutions per minute and forced into the cover and post extension. The force required was approximately 100 lbs. on the handle of the drill press or about 1,500 lbs. on the insert itself. The lip of the insert became embedded in the conical end of the insert embedded in the strap extension in about 15 seconds to give the assembly shown in FIG. 3.

Thus, we have described a novel storage battery construction in which the electrical path from element to terminal is short and direct. The terminal is positively locked in the wall of the battery container so as to be resistant to rotational and translational forces as well as other stresses found in battery service. This has been done without complicated design features and without having to mold metal inserts in the container walls. Finally, the construction can be accomplished in a rapid and efficient manner suitable to present day manufacturing needs.

We claim:
1. A storage battery comprising:
   a. a battery case having four walls;
   b. a cover having four walls, the walls of the cover abutting the walls of the case;
   c. at least one element within the case, the element comprising positive plates and negative plates and straps connecting like plates together;
   d. an enlargement in a wall of the case at its edge;
   e. an enlargement in a wall of the cover at its edge, the enlargement in the cover wall overlying the enlargement in the case wall when the cover abuts the case;
   f. the enlarged portion of the case wall containing a slot and the enlarged portion of the cover containing slot;
   g. the slots in the case and cover forming a cavity when the cover is placed on the case;
   h. a portion of the cavity being noncircular in cross section;
   i. a metallic extension to one of the straps substantially filling the cavity; and
   j. a metallic battery terminal insert terminating in a contact member outside the confines of the case and cover embedded in the case wall, the cover wall and the strap extension.

2. A battery as defined in claim 1 in which the strap extension terminates within the cavity and the contact member is attached thereto within the confines of the cavity.

3. A battery as defined in claim 1 in which a sealing material is located at the interface of the strap extension and the cavity in the case and cover.

4. A battery as defined in claim 1 in which the strap extension is further supported by a brace member formed in the cover thereof.

* * * * *